(12) United States Patent
Booth et al.

(10) Patent No.: US 12,108,188 B2
(45) Date of Patent: Oct. 1, 2024

(54) INTEGRATING SOFTWARE APPLICATION CONTENT INTO VIDEO CONFERENCES

(71) Applicant: Zoom Video Communications, Inc., San Jose, CA (US)

(72) Inventors: Simon Edward Booth, Livermore, CA (US); Raghavendra Bhagavatha, San Jose, CA (US); Roger Dean Collins, Seattle, WA (US); Andy Hendrickson, Novata, CA (US); Corey Hobbs, Inglewood, CA (US); Arun Janakiraman, San Francisco, CA (US); Shengwu Zhou, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/896,789

(22) Filed: Aug. 26, 2022

(65) Prior Publication Data
US 2023/0082886 A1 Mar. 16, 2023

Related U.S. Application Data

(63) Continuation of application No. PCT/CN2021/118870, filed on Sep. 16, 2021, and a
(Continued)

(51) Int. Cl.
*G06F 3/048* (2013.01)
*H04N 7/14* (2006.01)
*H04N 7/15* (2006.01)

(52) U.S. Cl.
CPC ............... *H04N 7/15* (2013.01); *H04N 7/147* (2013.01)

(58) Field of Classification Search
CPC .................................. H04N 7/15; H04N 7/147
See application file for complete search history.

(56) References Cited

U.S. PATENT DOCUMENTS 9,942,513 B1 * 4/2018 Aarrestad .............. H04N 7/147
10,681,300 B1 * 6/2020 Meccarelli ............. H04N 7/152
(Continued)

OTHER PUBLICATIONS

Borthne et al., Augmented Reality for Video Conferencing, 2014, IP.com, 6 pages.*
(Continued)

*Primary Examiner* — Linh K Pham
(74) *Attorney, Agent, or Firm* — Kilpatrick Townsend & Stockton LLP

(57) ABSTRACT

One example method for integrating software application content into video conferences includes receiving, by a video conferencing application executed by a client device from a video conference provider, one or more participant video streams, each participant video stream corresponding to a participant in a video conference; receiving, by the video conferencing application from a software application, software application content; receiving, by the video conferencing application from the software application, display layout information; generating, by the video conferencing application, a graphical representation of the video conference according to the display layout information, the graphical representation comprising at least a portion of the software application content and at least one of the one or more participant video streams; and displaying, by the video conferencing application, the graphical representation of the video conference.

17 Claims, 11 Drawing Sheets

Related U.S. Application Data continuation of application No. PCT/CN2021/117874, filed on Sep. 12, 2021.

(56) References Cited

U.S. PATENT DOCUMENTS

| | | | |
|---|---|---|---|
| 10,835,827 B1 | 11/2020 | Pather et al. | |
| 2007/0291108 A1* | 12/2007 | Huber | H04N 7/15 348/E7.083 |
| 2008/0130525 A1* | 6/2008 | Jansen | H04N 7/152 348/E7.071 |
| 2009/0271438 A1* | 10/2009 | Agapi | G06Q 10/109 |
| 2011/0292161 A1* | 12/2011 | Sharon | H04N 19/59 348/E7.083 |
| 2012/0204118 A1* | 8/2012 | Lefar | G06F 3/04883 715/756 |
| 2012/0262537 A1* | 10/2012 | Baker | H04N 7/15 348/E7.083 |
| 2013/0188007 A1* | 7/2013 | Duong | H04N 7/15 348/E7.083 |
| 2015/0334149 A1* | 11/2015 | Chougle | H04L 65/1083 348/14.07 |
| 2015/0334313 A1* | 11/2015 | Chougle | H04N 7/15 348/14.07 |
| 2019/0082143 A1* | 3/2019 | Ren | H04N 21/4316 |
| 2019/0335141 A1* | 10/2019 | Chen | G09G 5/38 |
| 2019/0377586 A1* | 12/2019 | Faulkner | G06F 9/451 |
| 2020/0126513 A1 | 4/2020 | Lau et al. | |
| 2020/0260050 A1* | 8/2020 | Pell | H04N 7/147 |
| 2021/0405865 A1* | 12/2021 | Faulkner | H04N 7/147 |
| 2023/0139723 A1* | 5/2023 | Thiel | G06T 13/40 715/757 |

OTHER PUBLICATIONS

Authors et al., Splitting a video stream into multiple substreams such that each substream can be displayed in it's own separate video area, 2015, IP.com, 4 pages.*

Wijngaarden et al., Multi-Stream Video Conferencing Over a Peer-to-Peer Network, 2010, IEEE, 15 pages.*

EP International Search Report and Written Opinion for PCT/CN2021/118870 mailed May 25, 2022.

PCT/CN2021/117874, "International Search Report and Written Opinion", Feb. 28, 2022, 13 pages.

PCT/CN2021/118870, "International Preliminary Report on Patentability", Mar. 21, 2024, 9 pages.

* cited by examiner

INTEGRATING SOFTWARE APPLICATION CONTENT INTO VIDEO CONFERENCES

CROSS-REFERENCE

This application is a continuation of PCT Application No. PCT/CN2021/117874, filed Sep. 12, 2021, titled "Integrating Software Application Content into Video Conferences," and a continuation of PCT Application No. PCT/CN2021/118870, filed Sep. 16, 2021, titled "Integrating Software Application Content into Video Conferences," the entirety of both of which are hereby incorporated by reference.

FIELD

The present application generally relates to video conferencing and more particularly relates to integrating software application content into video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
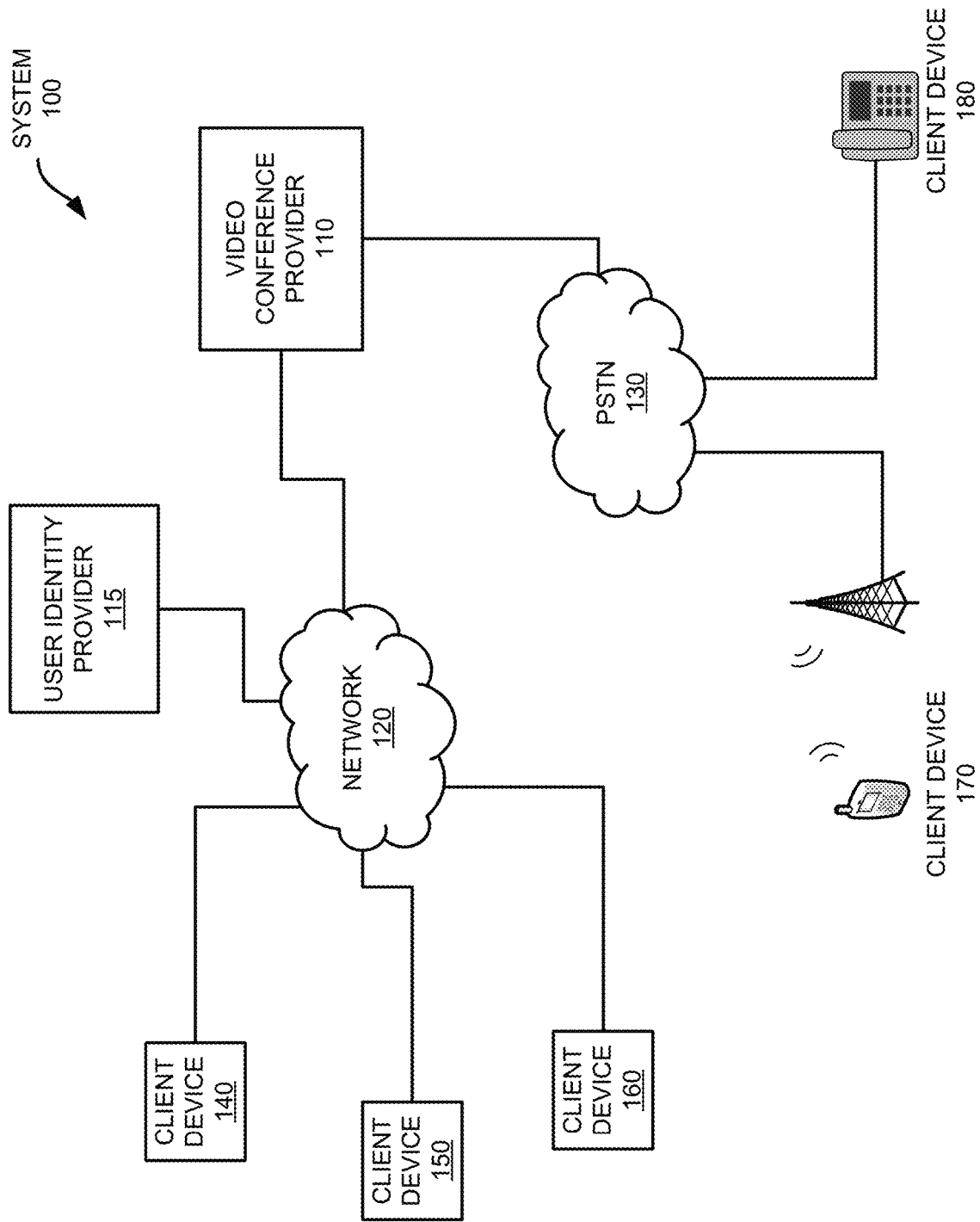
FIGS. 1-2 show example systems for integrating software application content into video conferences.

Examples are described herein in the context of integrating software application content into video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During video conferences, a host of a video conference may wish to change the appearance of the video conference as it is displayed to the participants. For example, a conventional video conference may be presented as a window on a display screen with one or more regions having video feeds from participants in the video conference, which may be arranged in a grid, to allow the participants to see at least some of the other participants. However, such a conventional representation may not be ideal for certain types of video conferences or if a participant intends to present content to other participants or if the participants are collaborating on an electronic document.

Instead, a video conferencing application executed by a user may interact with another software application to change the appearance of the video conference as displayed by the video conference application. For example, during a video conference, a participant may launch another software application, such as by selecting an option in the video conference application, to access a piece of content. After launching the application, the application communicates with the video conference application to change the appearance of the video conference application and to specify positions and sizes of various aspects of the video conference to be displayed.

For example, the application may be a gaming application that allows the participants in the video conference to play card games with each other. The application may communicate with the video conference provider to provide a background image for the entire video conference, which may replace a default background, e.g., a black background. In addition, the application may also communicate positions and sizes for regions in which to present video feeds received from the various participants or from the user's own camera. Still additional information may be provided, such as locations for cards provided to the respective users, locations for betting chips the users may be allocated, etc. This information may be provided in the form of coordinates in a two-dimensional plane (corresponding to the surface of the display device). In addition, the information may include depth or "layer" information to indicate which of the various displayed items should be placed in front of or behind other items.

For example, the background image may be assigned to layer 1, while user video feeds may be assigned to layer 2. Cards and betting chips may then be assigned to layer 3. Other graphical information, such as a close-up view of the user's cards or notifications, such as the winner of a hand, may be assigned to layer 4.

After receiving this information, the video conference software constructs a graphical representation of the video conference using the various graphical information—the background graphic, the video feeds, the cards. It positions the various items according to the received information, and overlays items with higher layer numbers over those with lower layer numbers. Thus, the video feeds are overlaid on the background image, while the cards or betting chips may obscure part of one or more video feeds. When a hand is completed, a notification may be temporarily displayed in front of everything else in the video conference before disappearing and resuming play.

After generating the graphical representation of the video conference, the video conference software transmits it to the video conference provider, which then distributes it to the participants to be displayed. Thus, the user's video conference software may be arbitrarily configured by the applications selected by the user according to the needs or instructions of the particular application.

While in this example, the software application was a card game application, video conference software according to this disclosure can receive display layout information from any software application. Further, some video conferencing applications may execute as platforms within which a software application may execute and thus may interact with the video conferencing application through direct application programming interface ("API") calls. In some cases, the applications may execute externally to the video conferencing application and communicate with the video conferencing application via inter-process communication ("IPC"), e.g., via messages. Each example, however, allows the software application to provide display layout information to enable the video conference application to generate a graphical representation of a video conference according to display layout information received from another application.

Example video conference applications according to this disclosure can provide more rich and immersive video conferencing experiences. The participants may be arranged as discussed above around a virtual table for a card game, or may be superimposed over a document that the participants are collaborating on. Further, the display layout information may change during the video conference, which may then change the graphical representation of the video conference that is presented to the various participants, such as based on changes to the setting provided in the other software application, e.g., moving to a new area of a game or to a new slide in a presentation deck. Further, some examples may allow the user executing the application to manually establish the display layout information and dynamically change the graphical representation of the video conference over time. Such functionality can enable software developers to integrate video conferencing functionality into their applications without needing to develop a video conferencing application or functionality.

Various additional examples are described in more detail below for integrating software application content into video conferences. One example method for integrating software application content into video conferences includes receiving, by a video conferencing application executed by a client device from a video conference provider, one or more participant video streams, each participant video stream corresponding to a participant in a video conference; receiving, by the video conferencing application from a software application, software application content; receiving, by the video conferencing application from the software application, display layout information; generating, by the video conferencing application, a graphical representation of the video conference according to the display layout information, the graphical representation comprising at least a portion of the software application content and at least one of the one or more participant video streams; and displaying, by the video conferencing application, the graphical representation of the video conference.

One example device includes a communications interface; a non-transitory computer-readable medium; and one or more processors configured to execute processor-executable instructions stored in the non-transitory computer-readable medium to receive, by a video conferencing application from a video conference provider, one or more participant video streams, each participant video stream corresponding to a participant in a video conference; receive, by the video conferencing application from a software application, software application content; receive, by the video conferencing application from the software application, display layout information; generate, by the video conferencing application, a graphical representation of the video conference according to the display layout information, the graphical representation comprising at least a portion of the software application content and at least one of the one or more participant video streams; and display, by the video conferencing application, the graphical representation of the video conference.

One example non-transitory computer-readable medium comprising processor-executable instructions configured to cause one or more processors to receive, by a video conferencing application executed by a client device from a video conference provider, one or more participant video streams, each participant video stream corresponding to a participant in a video conference; receive, by the video conferencing application from a software application, software application content; receive, by the video conferencing application from the software application, display layout information; generate, by the video conferencing application, a graphical representation of the video conference according to the display layout information, the graphical representation comprising at least a portion of the software application content and at least one of the one or more participant video streams; and display, by the video conferencing application, the graphical representation of the video conference These illustrative examples are given to introduce the reader to the general subject matter discussed herein and the disclosure is not limited to these examples. The following sections describe various additional non-limiting examples and examples of integrating software application content into video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
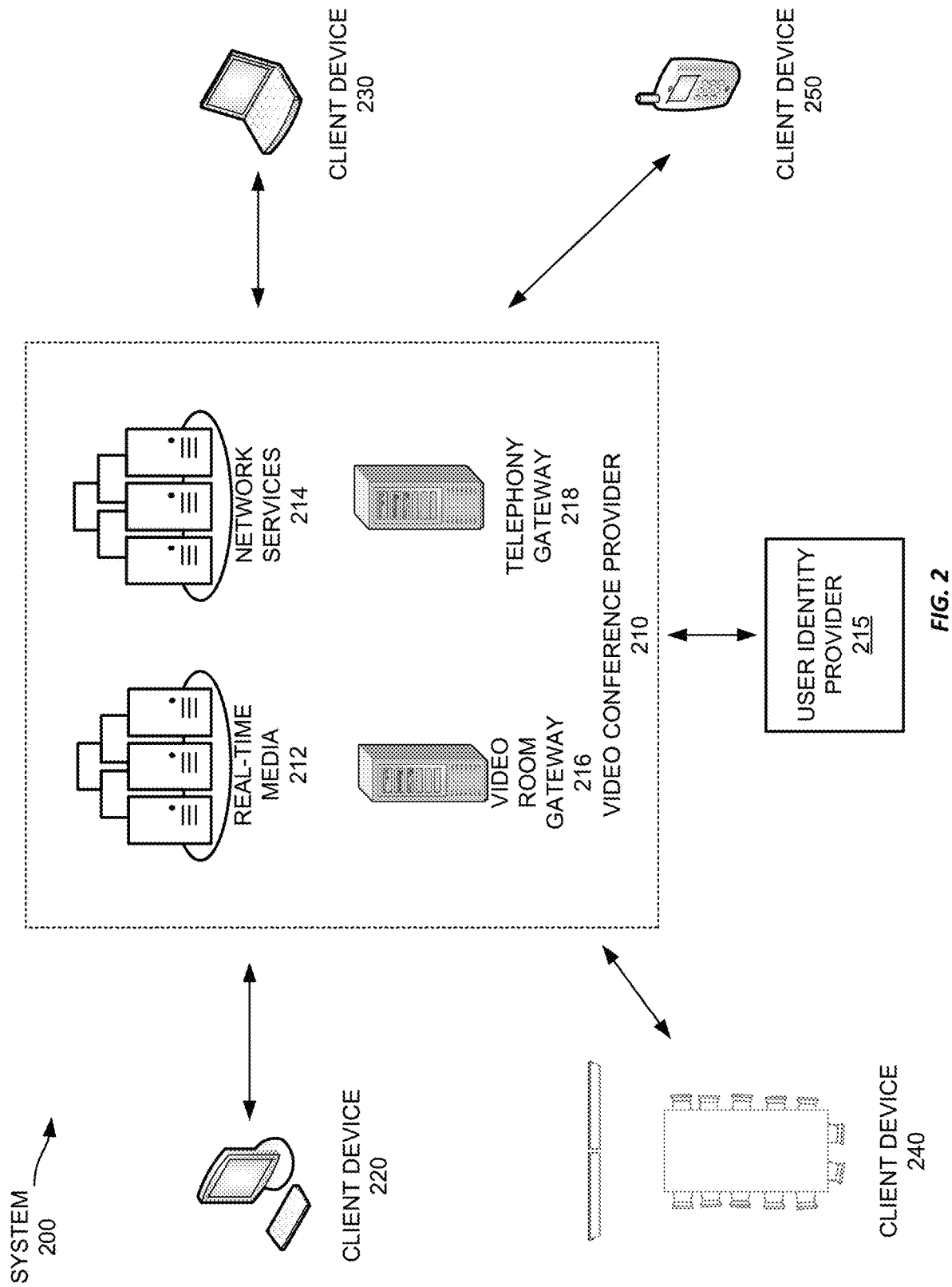

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
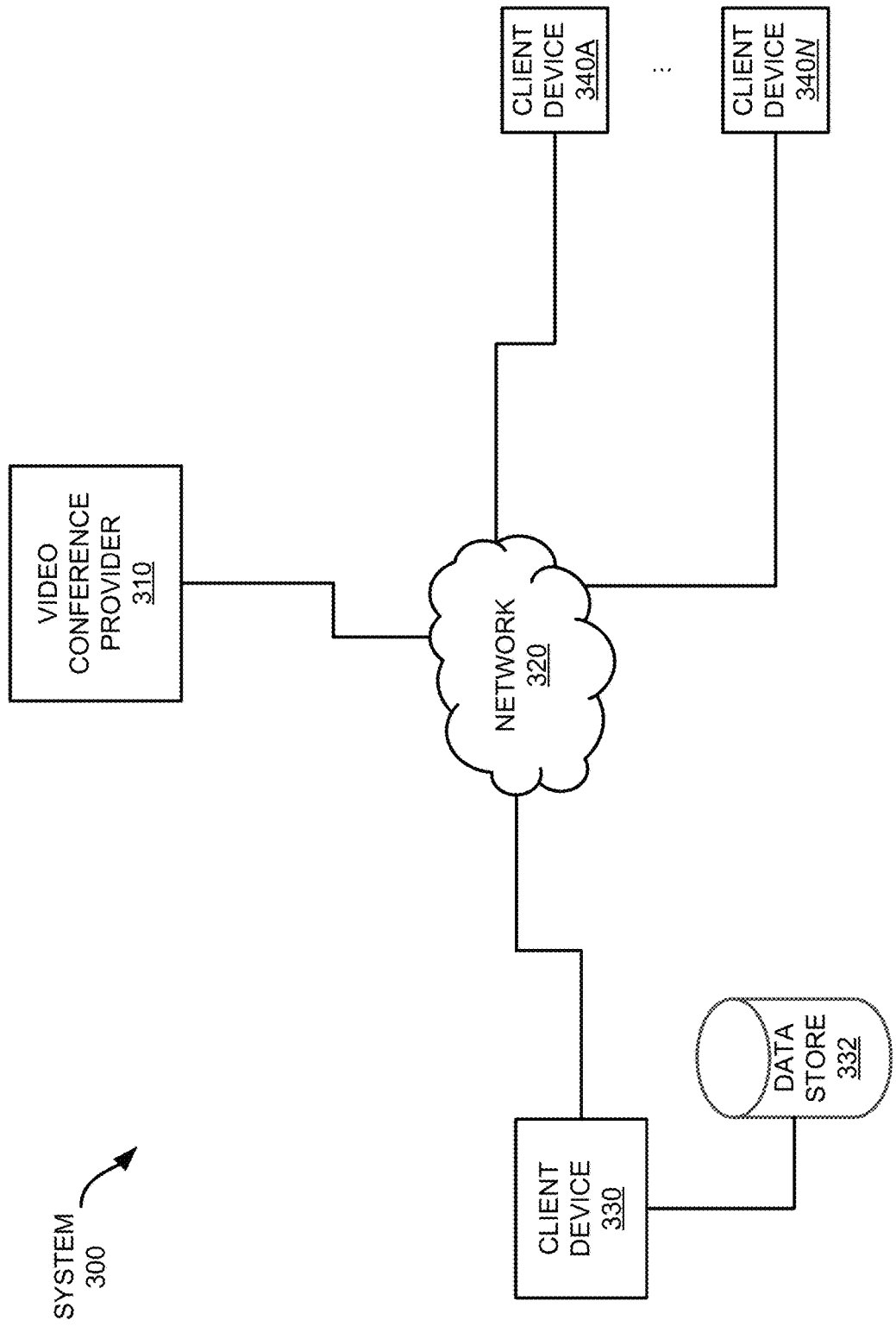
FIGS. 3A-3B show an example system for integrating software application content into video conferences.

Referring now to FIG. 3A, FIG. 3A shows an example system 300 for integrating software application content into video conferences. In this example system 300, a number of client device 330, 340a-n are connected to a video conference provider 310 via a communications network 320. In this example, the communications network 320 is the internet, however, any suitable communications network or combination of communications network may be employed, including LANs (e.g., within a corporate private LAN), WANs, etc.

Each client device 330, 340a-n executes video conference software, which connects to the video conference provider 310 and joins a meeting. During the meeting, the various participants (using video conference software at their respective client devices 330, 340a-n) are able to interact with each other to conduct the meeting, such as by viewing video feeds and hearing audio feeds from other participants, and by capturing and transmitting video and audio of themselves. However, during the meeting, a participant using client device 330 executes a software application to generate and provide content to the video conference.

Depending on the content to be provided, the user of client device 330 may execute any suitable software application. For example, to present a document, such as a word processing document, spreadsheet, presentation, etc., the user may execute a corresponding application to access, view, and edit the desired document. Other types of content may be presented using corresponding applications as well, such as videos, images, games, simulations, software development tools, visualization tools, etc. However, to integrate the content from the software application into a video conference, the software application may incorporate processor-executable instructions to enable it to communicate with a video conference application and to provide display layout information, in addition to the content itself.

Figure 3B:
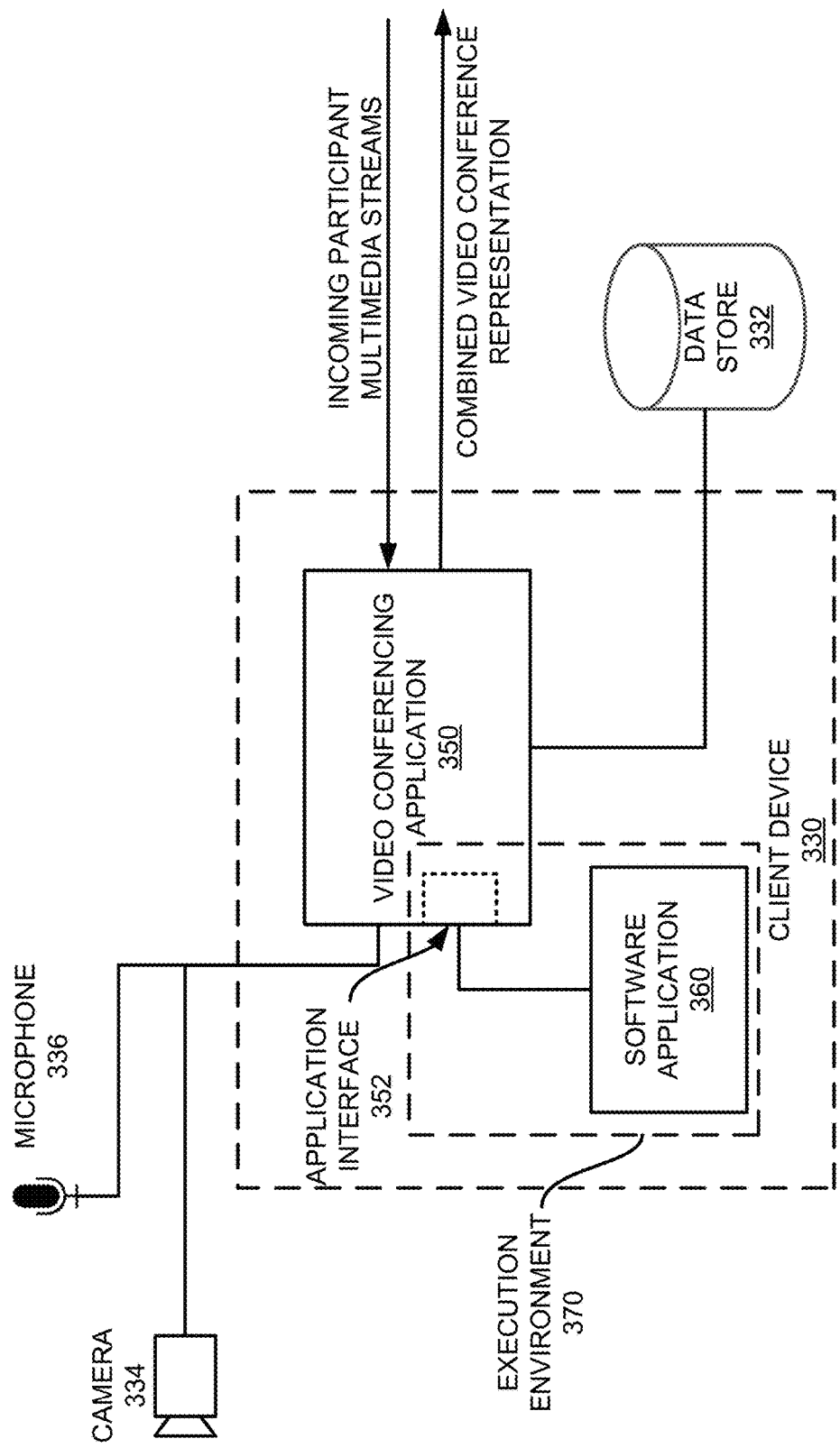

Referring now to FIG. 3B, FIG. 3B shows a more detailed view of the user's client device 330. In this example, the client device 330 executes a video conferencing application 350, which has been implemented to include an application interface 352. In this example, the application interface 352 is an API and suitable software applications executed by the client device 330 execute within the context of the video conferencing application 350, e.g., the video conferencing application provides an execution environment 370 for the software application. For example, the video conferencing application may include web browser functionality and software applications, e.g., software application 360, may execute within the web browser and interact with the video conferencing application via the application interface 352 as exposed within the web browser. However, no specific architecture is required to provide the execution environment.

Alternatively, software applications, e.g., software application 360, may execute discretely from the video conferencing application 350, e.g., both may execute as native applications on an underlying execution environment 370, such as an operating system, application server, etc., and the software application 360 may communicate with the video conferencing application 350 using messaging sent via IPC calls provided by the execution environment. The messaging interface may be defined as part of the application interface 352 to allow the software application to provide content and display layout information to the video conferencing application via IPC messaging.

After the software application 360 has been executed, it can interact with the video conferencing application 350 via the application interface to provide software application content, which may include audio or display output from the software application, and display layout information, which includes information to configure the video conferencing application 350 to provide a graphical representation of the video conference beyond the default appearance of a video conference within the video conferencing application 350. Software application content may be anything generated and output by the software application. This may include a view of a document, video, etc. that has been opened by the software application, or it may include a portion of such information or information generated specifically to be presented within a video conference. For example, if the participants in the video conference are collaborating on a document, the software application content may be a full view of the graphical user interface ("GUI") for the software application, including a portion of the document to be discussed. However, some applications may allow the user to select which information is to be provided to the video conference. For example, the user may be provided a separate window in which the software application's GUI is provided and the user may select a portion of the GUI to present or the software application such as by drawing a bounding box around the content to be shared. Some software applications may have certain content pre-defined to be shared, while other content is not, such as in the case of a timer application, which may provide a view of the timer to the video conferencing application, but provides a GUI with certain controls that the user can employ to adjust the operation of the timer.

In addition to the software application content, the software application provides display layout information, which describes the desired appearance of the video conference to the video conferencing application. The display layout information may include identifications of one or more participant video feeds to incorporate into the representation of the video conference, where to locate those feeds, the shape those feeds should take (e.g., within a square, rectangular, circular, etc. border, without a border, etc.), the appearance those feeds should have (e.g., only display the participant, display the participant and their background, display the participant and a user-selected background, etc.), etc. Similarly, it may also specify how to display the software application content, or other content, such as a video feed from the user's own camera 334 or content obtained from a data store 332, e.g., images, animations, background music, etc., that can be incorporated into the video conference. It may also include information to modify or hide certain controls that may be available by default from the video conferencing application, such as options to mute or unmute a participant's audio, disable other participants' ability to present content, etc.

While the software application 360 is running and providing the software application content and display layout information to the video conferencing application 350, the video conferencing application 350 is receiving incoming multimedia streams from other participants in the video conference, which may include audio streams, video streams, etc., as well as a video or audio streams from the user's own camera 334 or microphone 336.

The video conferencing application 350 then uses the display layout information to generate a graphical representation of the video conference from the software application content, the various video streams, content obtained from the data store 332, etc., and outputs the graphical representation of the video conference to the participants in the video conference. In addition, control information may be sent along with the graphical representation, which may affect available video conferencing controls (e.g., mute/unmute, etc. as discussed above) available to the participants. Thus, the participants may be presented with a partially or fully customized video conference experience while interacting with the software application content provided by the user of the client device 330.

To help illustrate how a software application, e.g., software application 360, may interact with a video conferencing application, e.g., video conferencing application 350, to create a customized video conference experience, reference will be made to FIGS. 4 through 7, which illustrate different example representations of a video conference.

Figure 4:
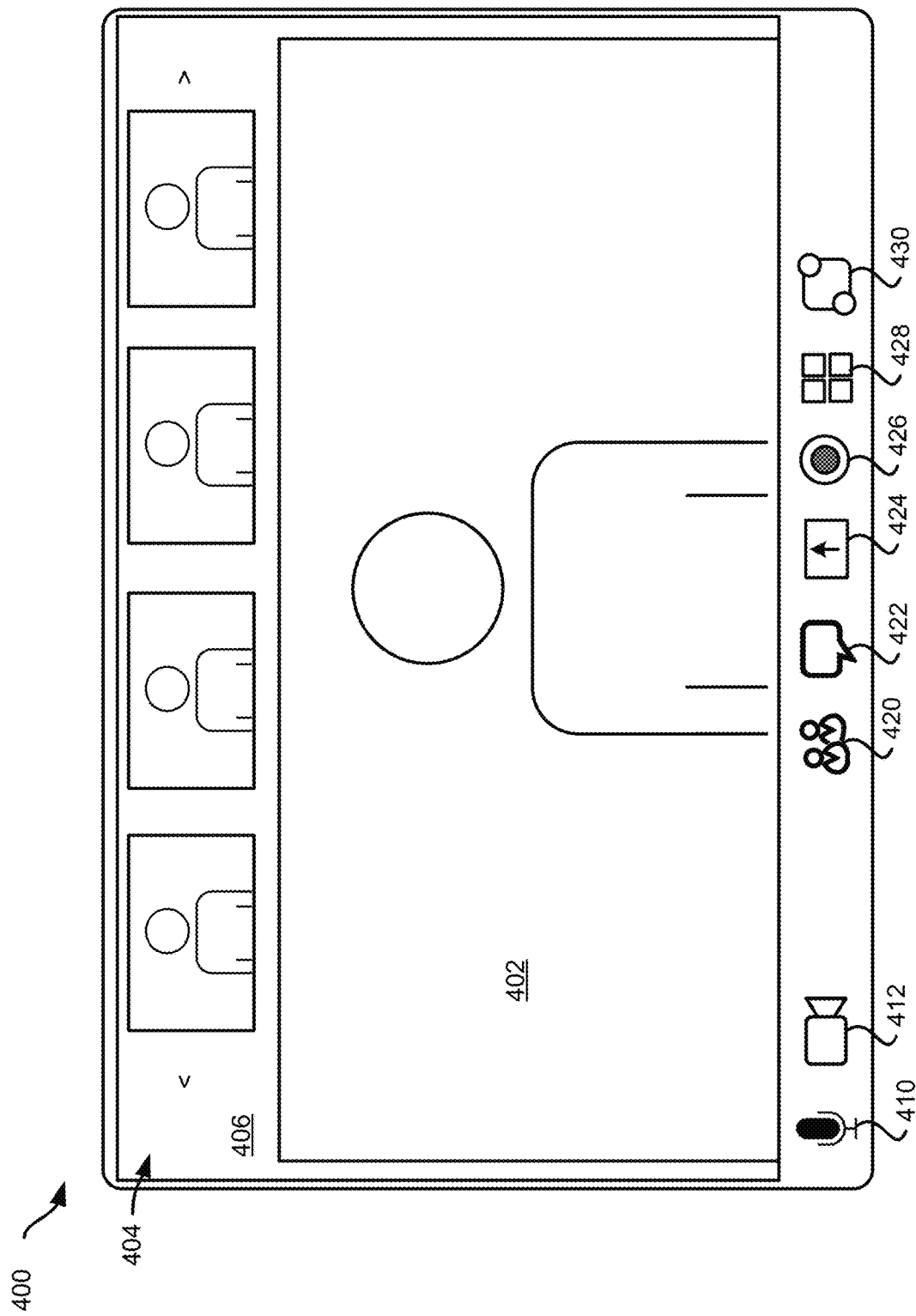
FIG. 4 shows an example default graphical user interface for integrating software application content into video conferences.

Referring now to FIG. 4, FIG. 4 shows an example default GUI 400 presented to participants in a video conference. A client device, e.g., client device 330 or client devices 340a-n, executes video conferencing software, which in turn displays the GUI 400 on the client device's display. In this example, the GUI 400 includes a speaker view window 402 that presents the current speaker in the video conference. Above the speaker view window 402 are smaller participant windows 404, which allow the participant to view some of the other participants in the video conference, as well as controls ("<" and ">") to let the host scroll to view other participants in the video conference. Both the speaker view window 402 and the participant windows are overlaid on a background 406, which is a solid black background in the default GUI 400.

Beneath the speaker view window 402 are a number of interactive elements 410-428 to allow the participant to interact with the video conference software. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room. Finally, control 430 allows the participant to launch an application, which may integrate content into the video conference as described within this disclosure.

Using the default GUI 400, a participant in a video conference is presented with a conventional view of other participants in the video conference overlaid on a black background 406. However, as discussed above, when the participant launches an application, such as by using control 430, the application may communicate with the video conferencing application to change the graphical representation of the video conference, e.g., by modifying part or all of the default GUI 400.

Figure 5:
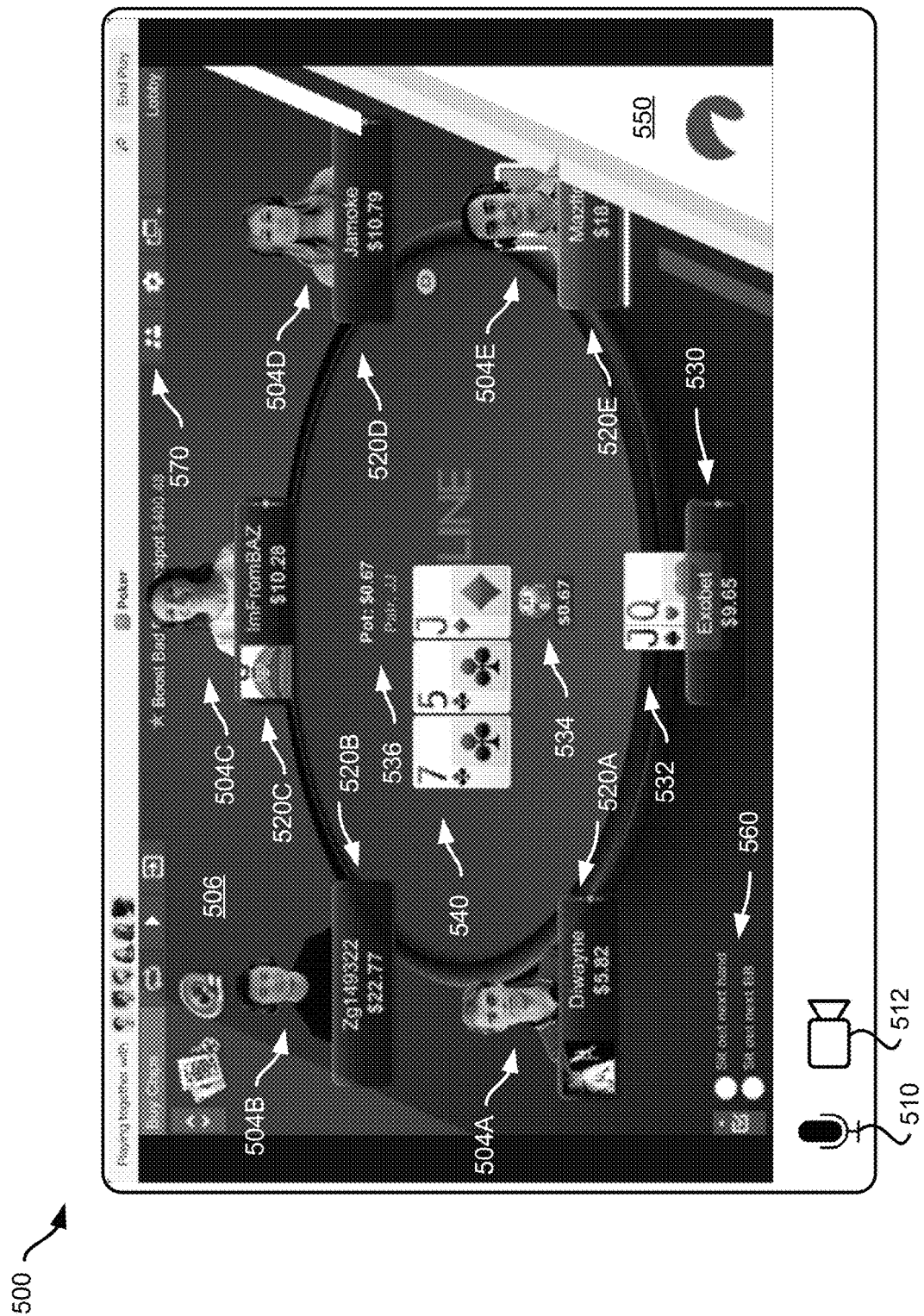
FIGS. 5-8 show example graphical user interfaces for integrating software application content into video conferences.

Referring now to FIG. 5, FIG. 5 shows an example GUI 500 that replaces default GUI 400 after a participant has launched a card game application. In this example, the card game application was launched within an execution environment provided by the video conferencing application. After it is launched, the card game application communicates with the video conferencing application via an API to provide software application content and display layout information to the video conferencing application. In this example, the card game application has provided multiple graphical elements that provide the look and feel of a poker game, including a background image 506 showing a poker table, a foreground image 550 showing a logo for the application's publisher, as well as player status windows 520*a-e* for each of the participants in the video conference and one window 530 for the user that launched the application, e.g., the host. Other graphical elements include the user's own cards 532, the user's bet into the pot 534, private information 536 for the user indicating the user's best hand from the available cards 532, 540, and community cards 540.

In addition to the software application content, the card game application has provided display layout information that specifies the location of the various software application content elements, as well as the location and appearance of the participant video feeds 504*a-e* displayed within the video conference. In this example, the display layout information specifies the locations of the player status windows 520*a-e*, 530, the foreground image 550, as well as certain game controls 560, 570, and the participant video feeds 504*a-e*. In this example, the display layout information also specifies that the participant video feeds should be filtered to eliminate any backgrounds and to only show the participants themselves without any other boundaries, as are used in the default GUI.

The display layout information also specifies the relative depth of each of the graphical elements to be displayed. For example, the display layout information may have the following depth or "layer" information:

Background Image 506: 0
Participant Video Feed 504*a*: 1
Participant Video Feed 504*b*: 1
Participant Video Feed 504*c*: 1
Participant Video Feed 504*d*: 1
Participant Video Feed 504*e*: 1
User's Bet 534: 1
Community Cards 540: 1
Foreground Image 550: 2
Participant Window 520*a*: 3
Participant Window 520*a*: 3
Participant Window 520*a*: 3

By assigning layers to each of these graphical elements, the video conferencing application can overlay one graphical element onto another one according to the depth information. Some examples, may use other layer values or may include special values, such as a negative value, to indicate graphical elements that should always be in the foreground and never have other information overlaid on them. A simple example showing layers and their relationship to each other is shown in FIG. 8, which will be described in more detail below.

In addition, certain graphical elements are not provided with layer values. In this example, this is an indication to the video conferencing application that such graphical elements should not be used to generate a graphical representation of the video conference. For example, the user's own cards 532 and hand information 536 is private information for the user and should not be shared with the other participants. Because the graphical representation of the video conference generated by the video conferencing application is shared with the other participants, the user's own private information should be omitted. In addition, certain other game controls 560, 570 may be omitted as well, either because the other participants will have their own control elements automatically displayed upon joining the game, or because the controls are not available to those users. Thus, such graphical elements may be omitted from the depth information. Alternatively, private information may be assigned negative values to indicate relative depths of the private information, but to also indicate the should not be used to generate the graphical representation of the video conference.

Finally, in this example, the display layout information includes information about video conferencing application controls that should be disabled during the card game. As can be seen in FIG. 5, the user retains access to the microphone and camera controls, but the other controls have been removed.

Once the video conferencing application has generated a graphical representation of the video conference based on the received software application content, one or more participant video feeds, display layout information, or other information, the video conferencing application provides the graphical representation to the video conference provider as a part of a video feed, which the video conference provider distributes to the other participants generally as discussed above with respect to FIGS. 1-2. It should be appreciated that the video conferencing application is providing the graphical representation as a video feed, it may continue to re-generate the graphical representation over time, such as at a predefined frame rate, predefined maximum frame rate, as fast as possible, etc., to provide a dynamic graphical representation to the other participants in the video conference.

And while this example was discussed in the context of a card game application, any type of application may be employed. Further, while the card game application in this example executed within an execution environment provided by the video conferencing application and communicated with the video conferencing application via an API, in some examples, a card game (or other) application may instead execute outside the context of the video conferencing application, or may employ IPC messages to communicate with the video conferencing application.

Figure 6:
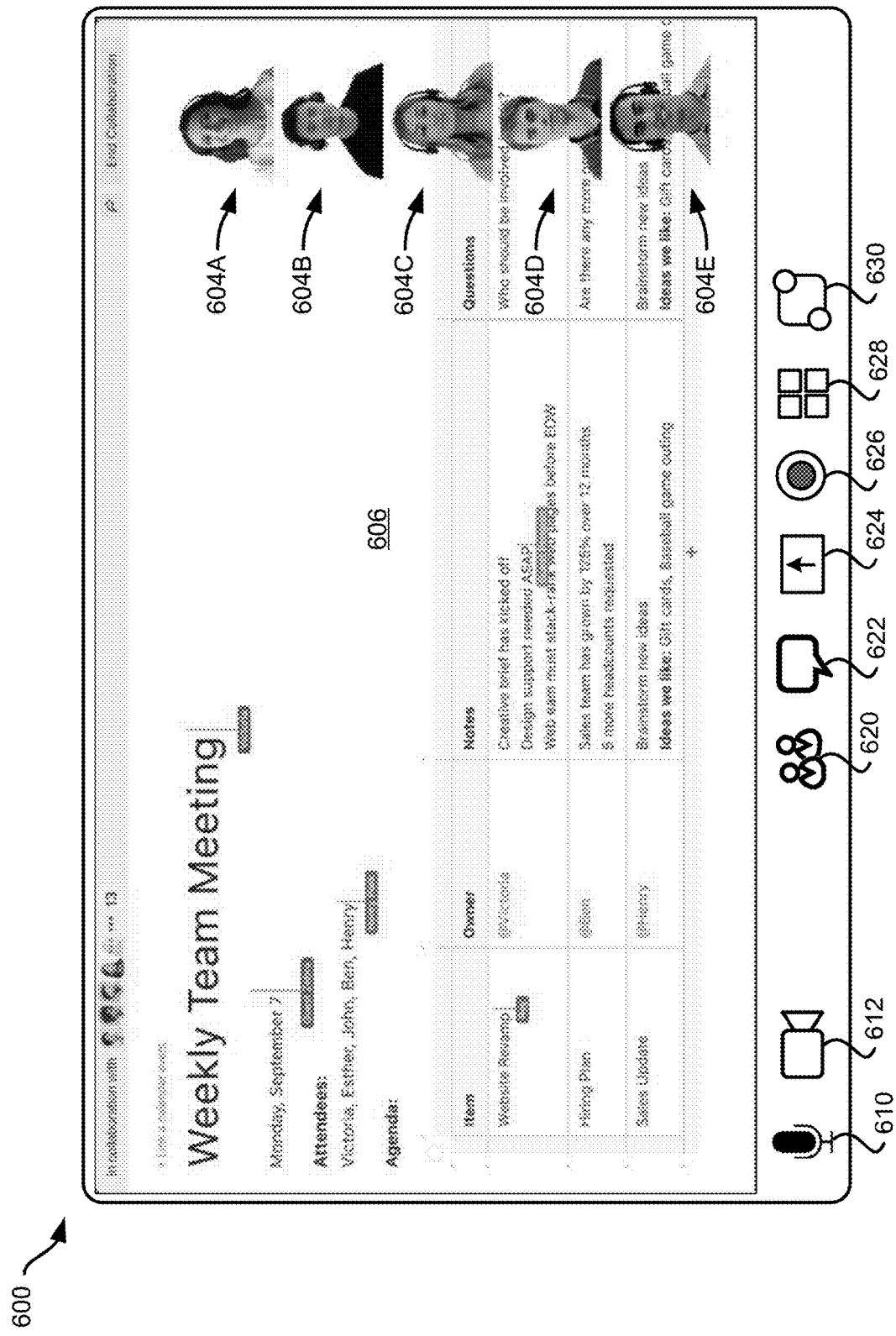

Referring now to FIG. 6, FIG. 6 shows an example GUI 700 that replaces default GUI 400 after a participant has launched a collaboration application. Similar to the example discussed above with respect to FIG. 5, the user of a client device (the host, in this example), e.g., client device 330, 340*a-n*, has executed an application for the participants in a video conference. In this example, the application is a collaborative application used during a team meeting held by video conference. The collaborative application displays a document that multiple of the participants are accessing at their own respective client devices, as can be seen by the various cursors associated with different individuals.

In this example, while the different participants are each able to view the shared document via applications executed at their respective client devices, the host has elected to run the application integrated with the video conference software to allow the participants to collaborate more closely. The host has launched the application using control 630 and the application is launched natively on the client device 330 and communicates with the video conference application via IPC messages. As with the card game application discussed above with respect to FIG. 5, the collaboration application provides software application content and display layout information to the video conference application.

Figure 7:
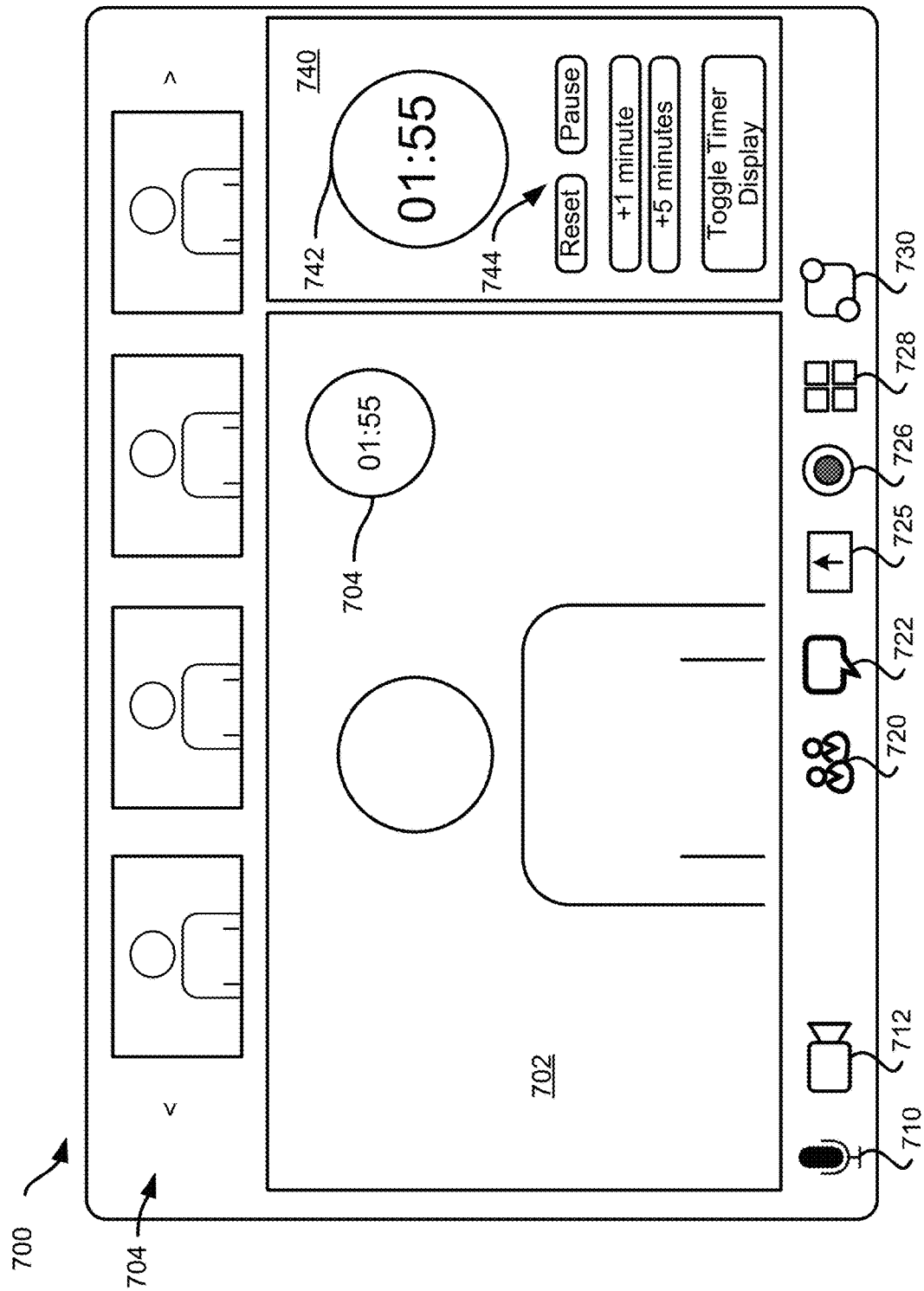

In this example, the software application provides software content information, which includes the view of the document 606 on which the participants are collaborating, as shown in FIG. 7. The document is shown as it appears in the host's application and has also been provided to the video conferencing application to generate a graphical representation of the video conference. In addition to the software application content, the software application also supplies display layout information via one or more IPC messages. In this example, the software application provides size, position, and display configurations for the participant video feeds 604*a*-*e*. As with the example shown in FIG. 5, the software application has specified that the participant video feeds should not include their respective backgrounds. In addition, it has established that the software application content 606 is set at layer 0, while the participant video feeds are set at layer 1 and displayed in a line on the right edge of the GUI 600. The video conference application receives the software application content, the participant video feeds, and the display layout information and uses it to generate the graphical representation of the video conference and provide it to the video conference provider, generally as discussed above with respect to FIG. 5.

Because the video conferencing application provides the generated graphical representation as part of the GUI 600 shown in FIG. 6, which is presented to each of the other participants in their respective GUIs, each of the participants can view the same portion of the document and work collaboratively with the other participants to revise the document as a team. And while the other participants are able to interact with their own copy of the application outside of the context of the video conference application, those edits will be reflected in the collaborative content displayed by the application run by the host and provided as part of the software application content to the video conferencing application.

Referring now to FIG. 7, FIG. 7 shows an example GUI 700 that modifies the default GUI 400 after a participant has launched a software application. Similar to the example discussed above with respect to FIG. 5, the user of a client device (the host, in this example), e.g., client device 330, 340*a*-*n*, has executed an application via the video conferencing application. In this example, the application is a timer application used during a team meeting held by video conference. The timer application displays a timer overlaid on the speaker's window 702 so that the speaker and other participants in the video conference can see how much time has been allocated to the speaker and how much remains of that time. In this example, the timer application is executed within an execution environment provided by the video conferencing application and communicates with it via an API.

In this example, the timer application modifies the video conferencing application's GUI 700 to overlay a time 704 onto the presenter window 702. The timer application itself is displayed as a separate GUI 740 within the GUI 704 displayed at the host's client device, and includes another view of the timer 742 as well as various controls 744 for modifying the timer, such as by adding one or five minutes, pausing the timer, resetting the timer, or toggling whether the timer 704 is displayed overlaid on the presenter window 702.

To overlay the timer on the presenter window, the timer application 740 communicates with the video conferencing application via an API and provides software application content, e.g., the timer 742, a position for the timer, and layer information associated with the presenter window 702 and the timer 742. In this application, the timer application provides layer information indicating that the timer 704 is to be overlaid on the presenter window 702 and that the timer 704 is to be displayed in an upper right portion of the presenter window 702. The timer application may provide updated software application content as the timer decrements (or increments, in some examples).

The video conferencing application receives the software application content and the display layout information and uses it along with the video feed for the presenting participant to generate the graphical representation of the video conference shown in FIG. 8. In this case, the modification to the GUI 700 is relatively minor as compared to those shown in FIGS. 5 and 6.

However, the timer application does not provide all aspects of its output to the video conferencing application in this example. Instead, the timer application's GUI 740 is displayed within the video conferencing application's GUI 704, but is not otherwise provided to the other participants. Thus, aspects of the timer application's display remain private for the host, while other aspects, i.e., the timer 704 overlaid on the presenter window 702 are sent to the other participants. And while this example shows a "private" GUI for a relatively simple timer application, any software application may provide such a private GUI for the user.

Figure 8A:
Figure 8B:
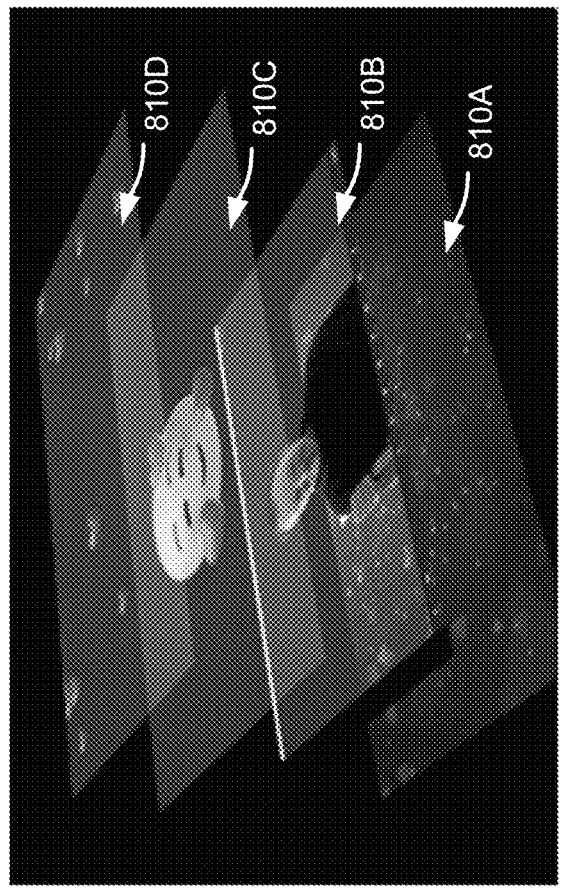

Referring now to FIGS. 8A-8B, FIGS. 8A-8B illustrate the use of layers, as discussed above with respect to FIGS. 3A-3B, and 4-7. In this example, FIG. 8A illustrates a graphical representation 800 of a video conference generated by a video conferencing application based on software application content and display layout information, as well as a participant video feed. FIG. 8B illustrates the layers of content that are used to generate the graphical representation 800.

In this example, a software application has provided a background animation, a smiley-face graphic, and a further foreground animation. In addition, it has provided display layout information that specified that the background animation is positioned at layer 810*a*, the participant's video feed is positioned at layer 810*b*, the smiley-face graphic is positioned at layer 810*c*, and the foreground animation is positioned at layer 810*d*.

After receiving the display layout information and the various software application content and video feed, the video conferencing application is able to generate the graphical representation 800 by combining the various graphical information according to the layer information contained in the display layout information. And while this example employs four layers, any number of layers may be employed according to different examples.

Figure 9:
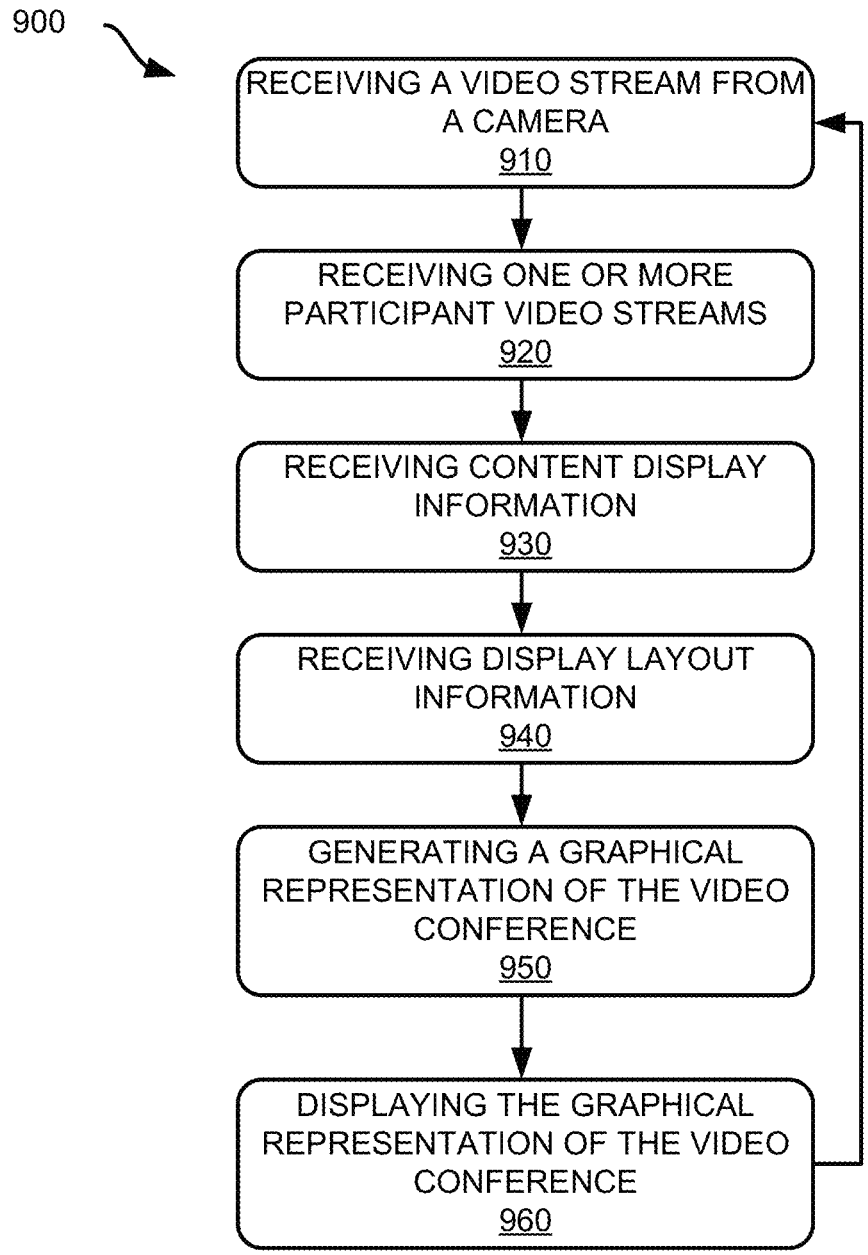
FIG. 9 shows an example method for integrating software application content into video conferences.

Referring now to FIG. 9, FIG. 9 shows an example method 900 for integrating software application content into video conferences. This example method 900 will be described with respect to the system shown in FIGS. 3A-3B; however, any suitable system according to this disclosure may be employed.

At block 910, a video conference application 350 executing on a client device 330 receives a video stream from a camera 334 connected to the client device 330. During a video conference, participants may record video and audio of themselves, which is then provided to the video conference provider 310 for distribution to other participants. Thus, the video conferencing application 350 may receive the video stream of the user from the camera 334 if the user has their camera active. However, the video conferencing application 350 may not receive a video stream, such as if the user of the client device disables their video using a GUI control, e.g., GUI control 412. Thus, block 910 may be option in some examples.

At block 920, the video conferencing application 350 receives one or more participant video streams from a video conference provider 310. As discussed above with respect to FIGS. 1 and 2, a video conference provider, e.g., video conference provider 310, may receive video and audio streams from one or more client devices 330, 340a-n during a video conference. It then distributes some or all of those video and audio streams to the participants so that they may interact with each other. Thus, the video conferencing application 350 receives video and audio streams that are distributed to it by the video conference provider 310.

At block 930, the video conferencing application 350 receives content display information from a software application 360 executed by the client device 330. As discussed above, software applications may be launched by a user via a control presented in a GUI, e.g., control 430 shown in FIG. 4. Alternatively, the user may launch the software application 360 externally to the video conferencing application 350.

As discussed above with respect to FIGS. 3A-3B and FIGS. 4-7, a software application 360 may execute within an execution environment provided by the video conferencing application 350. For example, the video conferencing application 350 may provide an execution environment such as an integrated web browser, and the software application 360 may execute as a web application within the web browser. In some examples, both the video conferencing application 350 and the software application 360 may execute within an execution environment, which may be a web browser, an operating system, an application server, etc.

The software application 360 may provide software application content via an API or IPC messaging, as discussed above, depending on the implementation or whether the software application 360 is executing within an execution environment provided by the video conferencing application 350 or within an execution environment where both the video conferencing application 350 and the software application 360 are executing.

It should be appreciated that a software application 360 may only provide some of the software application content generated by the software application 360. For example, as discussed above with respect to FIG. 7, the software application provides a timer to be overlaid on a presenter window, but separately provides a GUI 740 that is visible to the user, but is not shared with other participants in the video conference. Thus, a software application 360 may selectively provide software application content to the video conferencing application 350 in some examples.

At block 940, the video conferencing application 350 receives display layout information from the software application 360. As discussed above, the display layout information may provide position and sizing information for software application content provided by the software application. In some examples, it may also include layer information, which may establish which content should overlay other content. For example, as discussed above with respect to FIGS. 4-8, display layout information may specify the locations and sizes of various graphical elements of the software application content as well as the locations, sizes, or appearances of one or more participant video streams, or of the user's own video stream. In some examples, the display layout information may include information identifying portions of the software application content as being private, while still being displayed within the user's own graphical representation of the video conference, which may differ from the graphical representation of the video conference provided to the video conference provider 310, such as discussed with respect to the user's cards 532 and user's hand 536 in FIG. 5.

At block 950, the video conferencing application 350 generates a graphical representation of the video conference according to the display layout information, with the graphical representation comprising at least a portion of the software application content and one or more participant video streams. As discussed above with respect to FIGS. 4-8, the video conferencing application may modify or replace its default GUI based on the received software application content and display layout information, or it may overlay software application content over a portion of the default GUI, as shown in FIG. 7 where the timer 704 is overlaid on the default presenter window 702.

In some examples, the video conferencing application 350 may generate two separate graphical representations of the video conference. For example, as discussed above with respect to FIG. 5, certain software application content may be private for the user and, though it should be displayed for the user, it should not be provided to the other participants. Thus, the video conferencing application 350 may generate a first graphical representation that excludes the private software application content, which may be provided to the video conference provider 310, and a second graphical representation that is provided only to the user.

At block 960, the graphical representation of the video conference is displayed to the user and may also be provided to the video conference provider. For example, the graphical representation may be presented to the user, but not provided to the video conference provider 310 until the user selects an option to begin sharing the software application content. Alternatively, the software application content may all be designated as private, in which case, no graphical representation is provided to the video conference provider 310. Instead, only the user's audio or video streams may be provided. In some examples, the graphical representation (or a different graphical representation) may be provided to the video conference provider 310 to distribute to the other participants in the video conference.

After the processing at block 960 has completed, the method 900 returns to block 910 and preforms the method 900 again to generate an additional graphical representation. It may repeat indefinitely, and at a suitable rate (e.g., 24, 25, or 30 frames per second), to continue providing an updated graphical representation of the software application content over time during the video conference.

Figure 10:
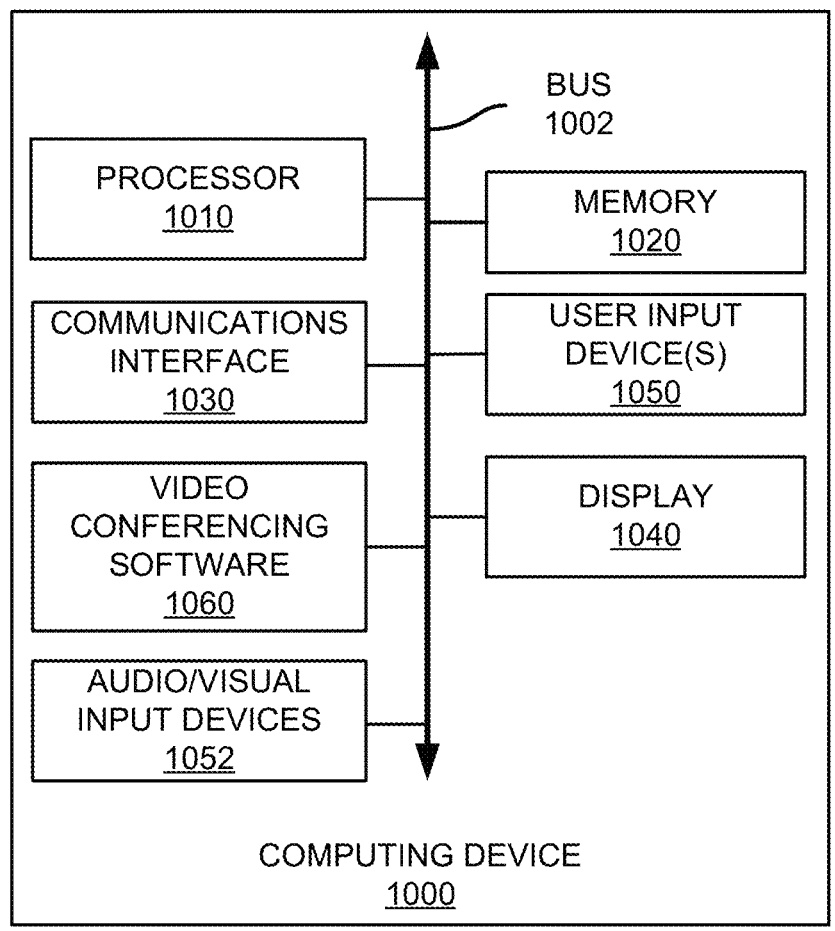
FIG. 10 shows an example computing device suitable for use with example systems and methods for integrating software application content into video conferences.

Referring now to FIG. 10, FIG. 10 shows an example computing device 1000 suitable for use in example systems or methods for integrating software application content into video conferences according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing dynamic content to video conference waiting rooms according to different examples, such as part or all of the example method described above with respect to FIG. 9. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes video conference software 1060 to enable a user to join and participate in a video conference, such as a conventional meeting or webinar, by receiving multimedia streams from a video conference provider, sending multimedia streams to the video conference provider, joining and leaving breakout rooms, providing software application content, etc. such as described throughout this disclosure, etc.

The computing device 1000 also includes a communications interface 1040. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

'While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, by a video conferencing application executed by a client device from a video conference provider, one or more participant video streams, each participant video stream corresponding to a participant in a video conference;
receiving, by the video conferencing application from a software application, software application content;
receiving, by the video conferencing application from the software application, display layout information;
generating, by the video conferencing application, a graphical representation of the video conference according to the display layout information, the graphical representation comprising at least a portion of the software application content and at least one of the one or more participant video streams;
providing, by the video conferencing application to the video conference provider, the display layout information to provide to each participant in the video conference; and
displaying, by the video conferencing application, the graphical representation of the video conference.

2. The method of claim 1, wherein the video conferencing application provides an execution environment, and wherein the software application executes within the execution environment.

3. The method of claim 2, wherein the software application communicates with the video conferencing application using an application programming interface provided by the video conferencing application.

4. The method of claim 1, wherein the display layout information comprises a size and position corresponding to at least one of the one or more participant video streams, and wherein generating the graphical representation comprises positioning the at least one of the one or more participant video streams within the graphical representation based on the size and position.

5. The method of claim 1, wherein the display layout information comprises content layer information associated with at least one of (i) the software application content, (ii) a video stream received from a camera communicatively coupled to the client device, or (iii) the one or more participant video streams.

6. The method of claim 1, further comprising:
receiving, by the video conferencing application, multimedia content; and
wherein generating the graphical representation of the video conference comprises including the multimedia content in the graphical representation.

7. A non-transitory computer-readable medium comprising processor-executable instructions configured to cause one or more processors to:
receive, by a video conferencing application executed by a client device from a video conference provider, one or more participant video streams, each participant video stream corresponding to a participant in a video conference;
receive, by the video conferencing application from a software application, software application content;
receive, by the video conferencing application from the software application, display layout information;
generate, by the video conferencing application, a graphical representation of the video conference according to the display layout information, the graphical representation comprising at least a portion of the software application content and at least one of the one or more participant video streams;
provide, by the video conferencing application to the video conference provider, the display layout information to provide to each participant in the video conference; and
display, by the video conferencing application, the graphical representation of the video conference.

8. The non-transitory computer-readable medium of claim 7, wherein the video conferencing application provides an execution environment, and wherein the software application executes within the execution environment.

9. The non-transitory computer-readable medium of claim 8, wherein the software application communicates with the video conferencing application using an application programming interface provided by the video conferencing application.

10. The non-transitory computer-readable medium of claim 7, wherein the display layout information comprises a size and position corresponding to at least one of the one or more participant video streams, and further comprising processor-executable instructions configured to cause the one or more processors to position the at least one of the one or more participant video streams within the graphical representation based on the size and position.

11. The non-transitory computer-readable medium of claim 7, wherein the display layout information comprises content layer information associated with at least one of (i) the software application content, (ii) a video stream received from a camera communicatively coupled to the client device, or (iii) the one or more participant video streams.

12. The non-transitory computer-readable medium of claim 7, further comprising processor-executable instructions configured to cause the one or more processors to:
receive, by the video conferencing application, multimedia content; and
include the multimedia content in the graphical representation.

13. A device comprising:
a communications interface;
a non-transitory computer-readable medium; and
one or more processors configured to execute processor-executable instructions stored in the non-transitory computer-readable medium to:
receive, by a video conferencing application from a video conference provider, one or more participant video streams, each participant video stream corresponding to a participant in a video conference;
receive, by the video conferencing application from a software application, software application content;
receive, by the video conferencing application from the software application, display layout information;
generate, by the video conferencing application, a graphical representation of the video conference according to the display layout information, the graphical representation comprising at least a portion of the software application content and at least one of the one or more participant video streams;
provide, by the video conferencing application to the video conference provider, the display layout information to provide to each participant in the video conference; and
display, by the video conferencing application, the graphical representation of the video conference.

14. The device of claim 13, wherein the video conferencing application provides an execution environment, and wherein the software application executes within the execution environment.

15. The device of claim 14, wherein the software application communicates with the video conferencing application using an application programming interface provided by the video conferencing application.

16. The device of claim 13, wherein the display layout information comprises a size and position corresponding to at least one of the one or more participant video streams, and wherein the one or more processors are configured to execute further processor-executable instructions stored in the non-transitory computer-readable medium to position the at least one of the one or more participant video streams within the graphical representation based on the size and position.

17. The device of claim 13, wherein the display layout information comprises content layer information associated with at least one of (i) the software application content, (ii) a video stream received from a camera communicatively coupled to the device, or (iii) the one or more participant video streams.

* * * * *